Aug. 7, 1951 J. H. TEAF ET AL 2,563,664
SEQUENTIAL TUNER FOR RADIO SETS
Filed Oct. 23, 1946 5 Sheets-Sheet 1
Fig. 1
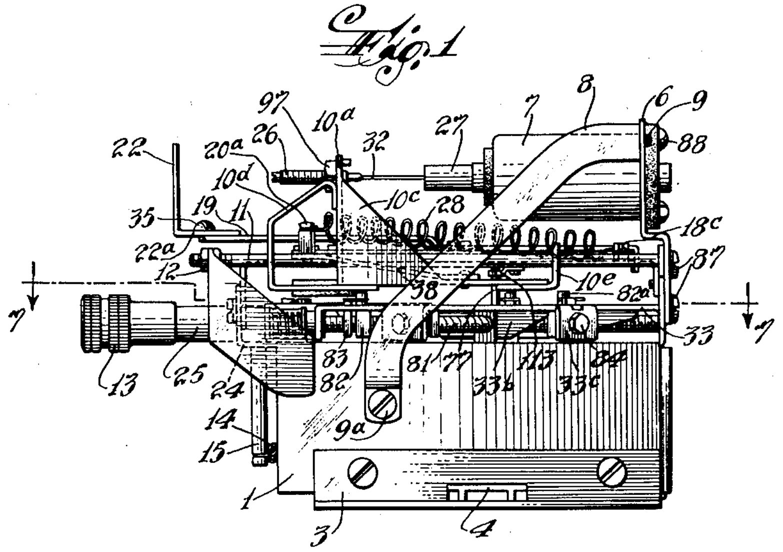
Fig. 2 Fig. 3
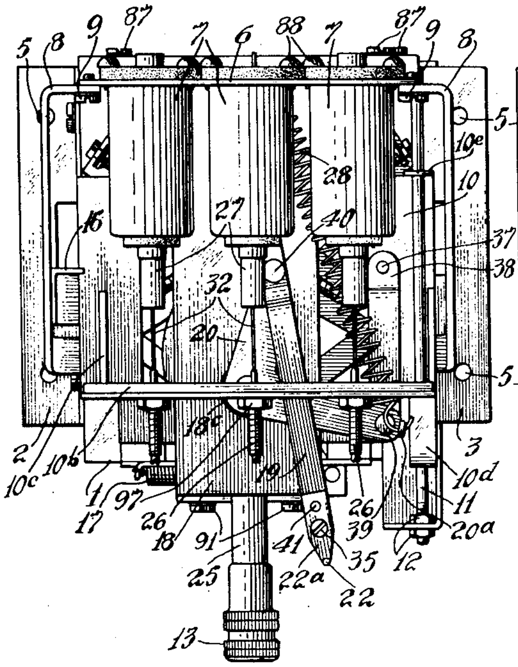
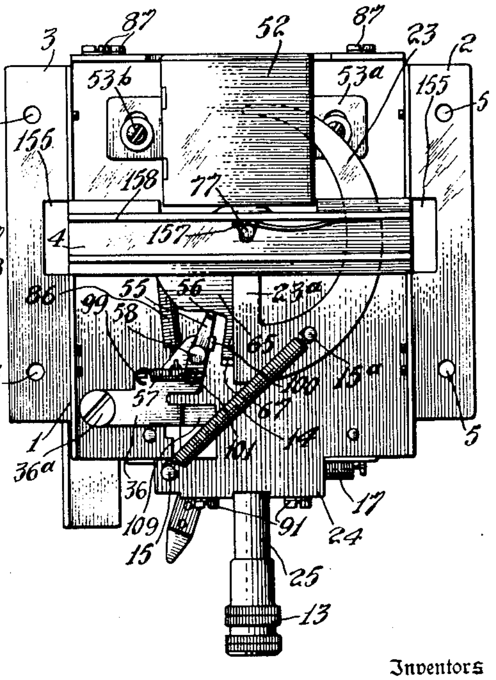
Inventors
Stanley S. Cramer
John H. Teaf
By A. D. T. Libby
Attorney Aug. 7, 1951 J. H. TEAF ET AL 2,563,664

SEQUENTIAL TUNER FOR RADIO SETS

Filed Oct. 23, 1946 5 Sheets-Sheet 2

Inventors
Stanley S. Cramer
John H. Teaf
By A. D. T. Libby
Attorney

SEQUENTIAL TUNER FOR RADIO SETS

Filed Oct. 23, 1946 5 Sheets-Sheet 3

Inventors
Stanley S. Cramer
John H. Teaf
A. D. T. Libby
Attorney

SEQUENTIAL TUNER FOR RADIO SETS

Filed Oct. 23, 1946 5 Sheets-Sheet 4

Inventors
Stanley S. Cramer
John H. Teaf
A. D. T. Libby
Attorney

Inventors
Stanley S. Cramer
John H. Teaf
By
A. D. T. Libby
Attorney

Patented Aug. 7, 1951

2,563,664

UNITED STATES PATENT OFFICE 2,563,664

SEQUENTIAL TUNER FOR RADIO SETS

John Howard Teaf, Delaware Township, Colwick County, and Stanley S. Cramer, Haddon Heights, N. J., assignors to Radio Condenser Company, Camden, N. J.

Application October 23, 1946, Serial No. 705,106

37 Claims. (Cl. 74—10.15)

This invention relates to an electromagnetically operated sequential tuner or selector for radio sets.

It is the principal object of our invention to provide a new and improved mechanism for sequentially selecting one or a plurality of radio stations operating on different frequencies, the mechanism to be operable at the receiver or some remote place without mechanical interconnection between the receiver and the remote place, a pair of wires and a single circuit push button switch being all that is necessary for operating the receiver mechanism.

Another object of our invention is to provide a mechanism that is applicable to most any type of radio receiver but one that is particularly useful in automobile receiving sets.

A further object of our invention is to provide a mechanism or means for sequentially selecting a tuned frequency of a radio receiver through a plurality of stations and then to a position for manual operation and thereafter repeating the same by simply depressing a single impulse push-button switch, once for each desired change in sequence, as for example, station number 1 may be set for 560 kc.; station 2 for 610 kc.; station 3 for 990 kc.; station 4 for 1060 kc.; station 5 for 1210 kc.; then the 6th or manual position in sequence of the structure will enable the operator to cover the entire broadcast band of from say 540 kc. to 1620 kc. very quickly by operating the manual control.

It is a further object of our invention to provide a mechanism in which the same manual control knob is capable of changing the setting or tuning of the stations previously referred to, to any frequency within the range of the receiver.

A further object of our invention is to provide certain damping means to eliminate excessive shocks usually present in such electro-magnetically operated devices.

A further object of our invention is to provide a mechanism which will require a minimum amount of battery drain especially where the set is used in automobiles.

To accomplish these various objects, we have utilized inductive tuning wherein adjustable permeability cores are mounted in such a manner that they may be easily moved back and forth within their associated coils which are connected with fixed capacities in a well-known manner. To actuate the mechanism to be herein described we have utilized as the source of motor power a rotary type solenoid such as disclosed in Cramer Patent 2,337,375, issued December 12, 1943, and in the utilization of this type of tuning we have provided a rigid structure and means for eliminating back-lash or play between the moving parts so that the precise tuning core position can be repeated with great accuracy as the selector or tuning mechanism moves through its successive cycle steps.

The apparatus or mechanism to be herein described has been evolved after much study and experimentation in order to provide a mechanism that cannot be jammed and rendered inoperable through the various steps in the cycle; in other words, the mechanism is such that when the solenoid is energized by the operation of the push button, a full step will be completed, so that all parts of the mechanism will maintain their sequential relationship, whereby another push of the button will complete a succeeding and full sequential movement.

Furthermore, even if a cycle should be left incomplete due to a momentary low voltage or an insufficient duration of current, the mechanism is arranged to complete such a cycle upon sufficient application of a proper voltage.

The various objects and advantages cited, as well as others, will be discerned from a study of the following specification taken in connection with the annexed drawings, wherein:

Figure 1 is a side view of the selector or tuner.

Figure 2 is a plan view of the structure shown in Figure 1.

Figure 3 is a bottom view of the structure as shown in Figure 2.

Figures 8, 9, 10, 11, 12, 12A:
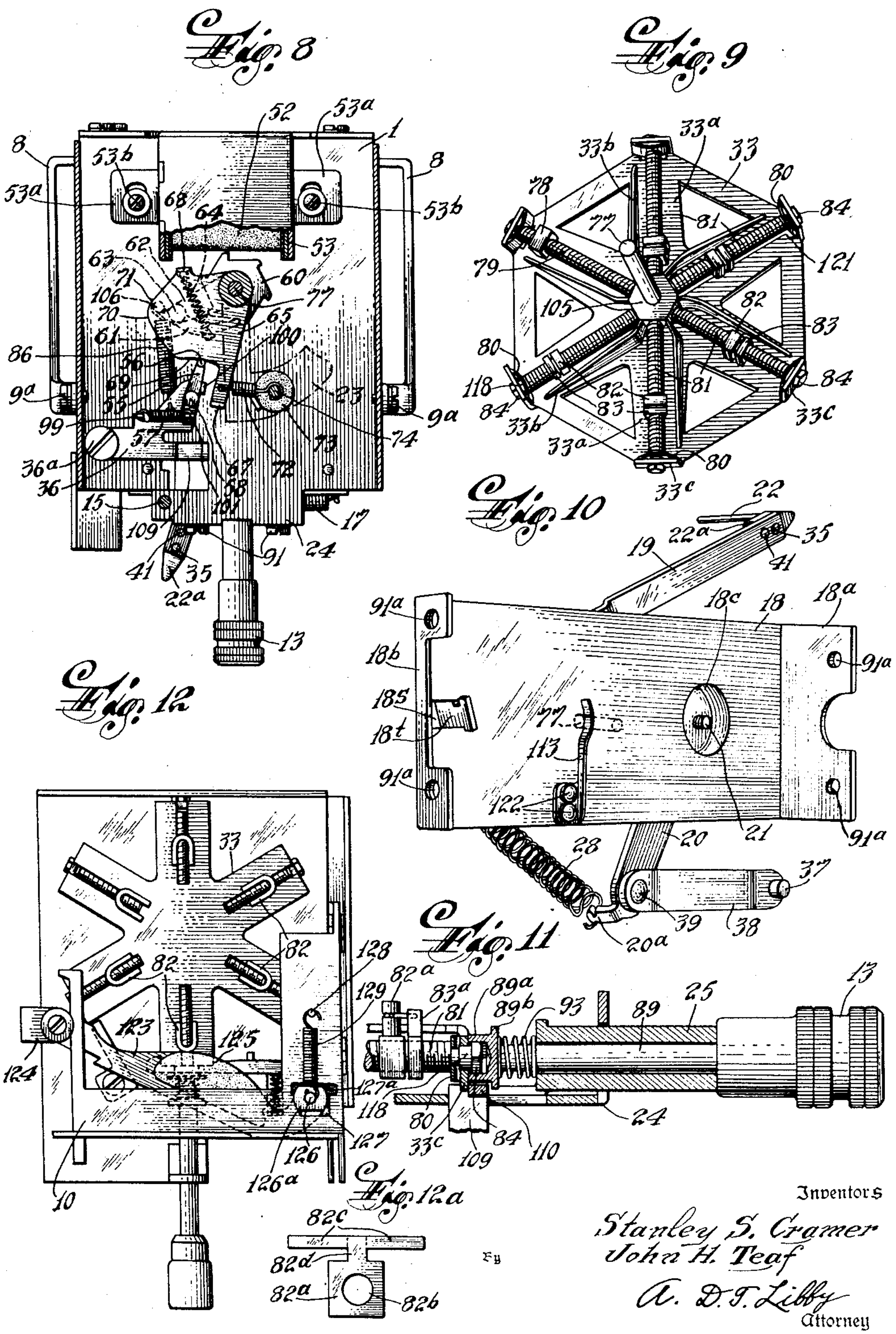
Figure 8 is a view on the line 8—8 of Figure 4.
Figure 9 is a view of the tuner turret, only showing the reverse side from its showing in Figure 7.
Figure 10 is a perspective view of the indicator support bracket looking toward the bottom part thereof.
Figure 11 is a part-sectional and part-elevational view on the line 11—11 of Figure 6.
Figure 12 is a view somewhat like Figure 6, showing a ratio lever for amplifying the stroke of the core carriage with respect to the adjustment of the driving lugs on the turret.

Figure 12*a* is a plan view of the blank for forming into the tuning stop shown in Figure 12.

Figure 13:
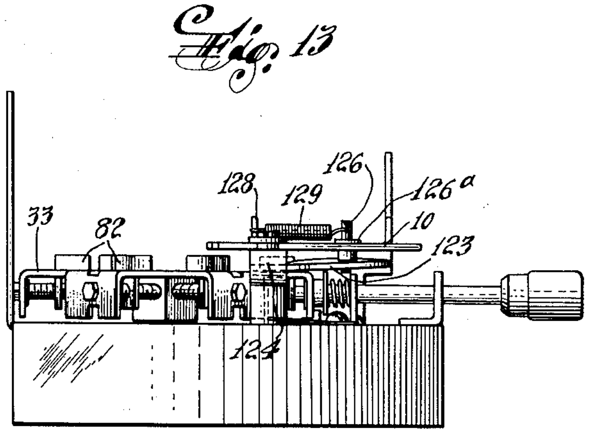

Figure 13 is a side view of the construction shown in Figure 12.

Figures 14, 15, 16:
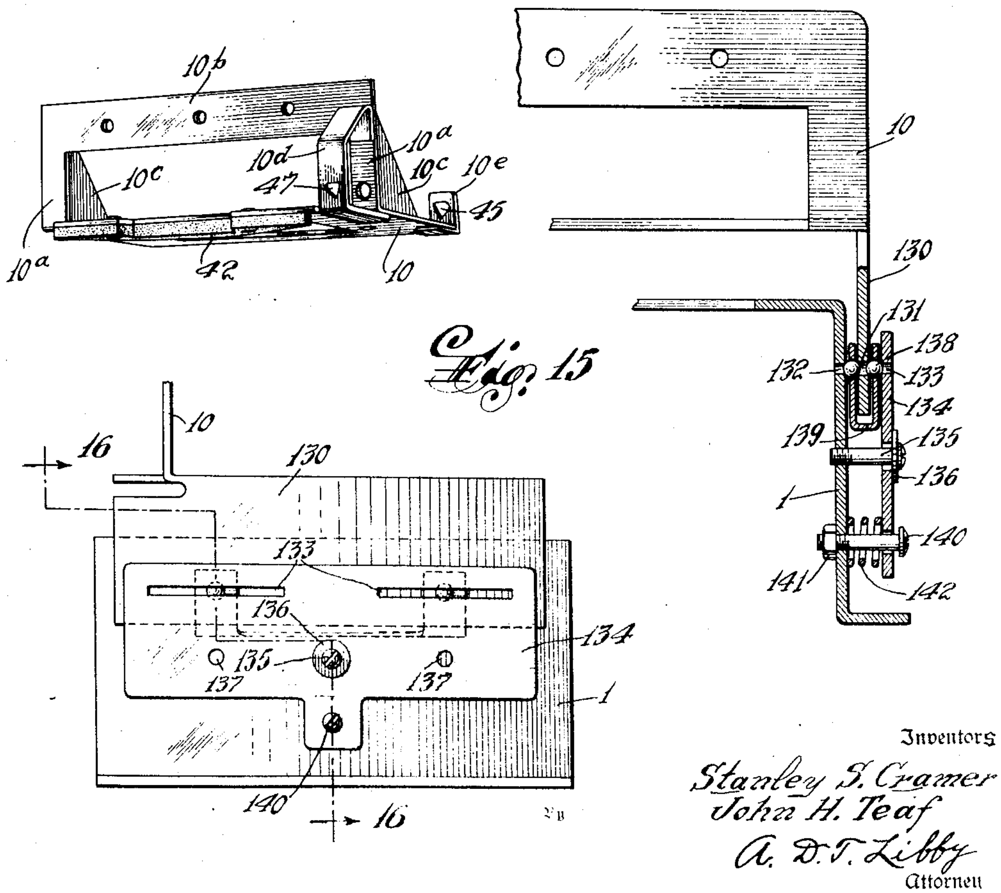

Figure 14 is a perspective view of the tuning carriage per se.

Figure 15 is a view showing a modified form of supporting the tuning carriage.

Figure 16 is a view on the line 16—16 of Figure 15, but on a somewhat enlarged scale.

Figure 17:
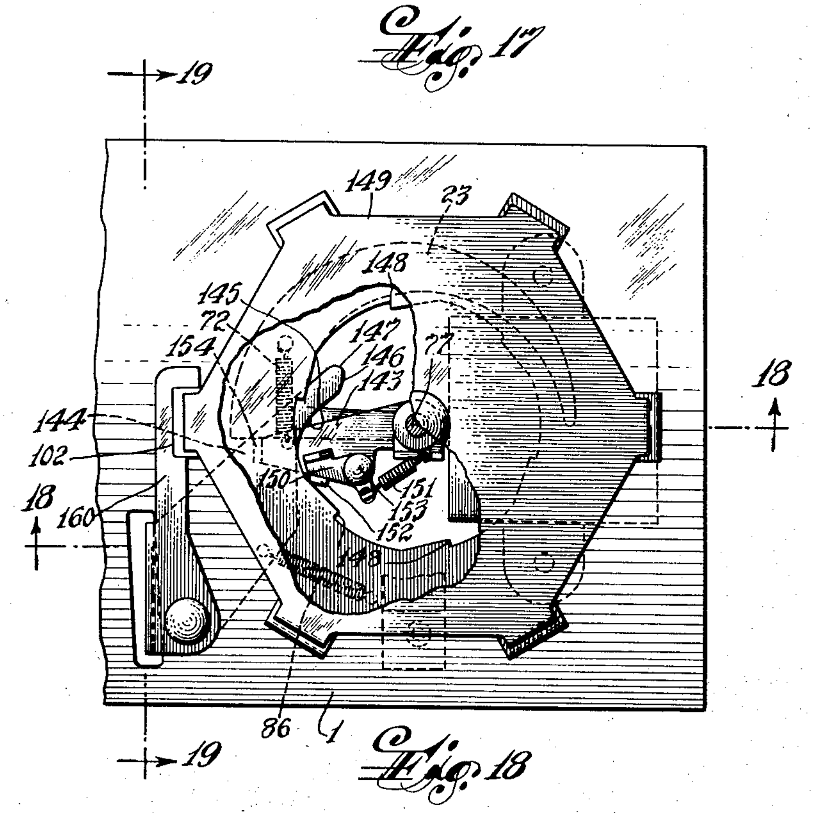

Figure 17 is a view showing a modified form of turret indexing and unlatching mechanism.

Figure 18:
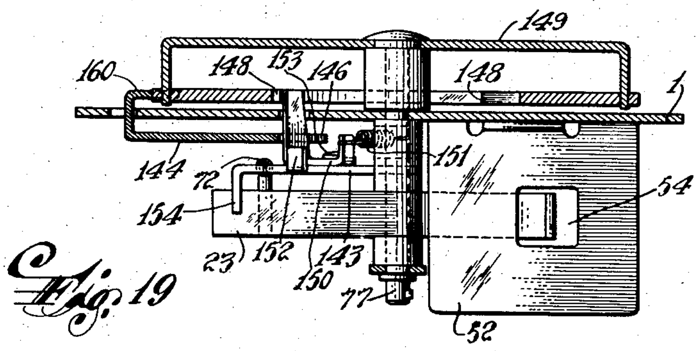

Figure 18 is a view on the line 18—18 of Figure 17.

Figure 19:
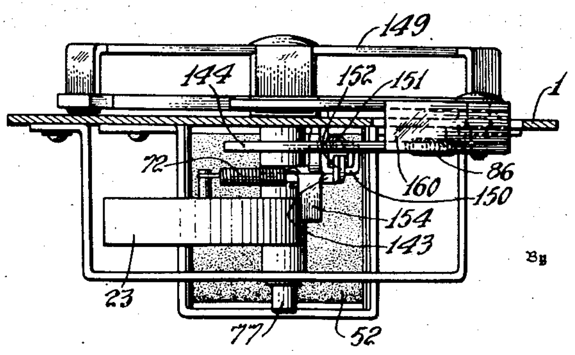

Figure 19 is a view on the line 19—19 of Figure 17.

Referring now to the details wherein like numbers refer to corresponding parts, 1 is a main support frame having side mounting flanges 2 and 3 with screw holes 5 therein for mounting the frame 1. Projecting into openings 155 in flanges 2 and 3 is a bearing plate 4 securely fastened as by staking or welding to the side member of frame 1 (see Figure 3). It will be noted from this figure that the member 4 has a triangularly shaped hole therein to receive the end of the shaft 77. Spring 157 is fastened to one of the ribs 158 and engages the end of the shaft and holds it into the apex of the triangularly shaped hole. By reason of this special construction this shaft end is eliminated from any wobble and insures constant axial center. A mounting bracket 6 is attached to a rear bent up portion of the frame 1 by screws 87 (see Figure 1). Mounted on the bracket 6 are three separate induction coil assemblies collectively numbered 7. To rigidly hold the induction coil bracket 6 in position a pair of braces 8 are fastened thereto by screws 9 and to the frame by screws 9*a*.

A tuning core adjusting carriage 10 is provided. The carriage is made up of a frame type of plate 10 in which the center portion is removed and has oppositely disposed upwardly extending arms 10*a* connected at their ends by a cross bar 10*b* with side members 10*c* also anchored to the plate 10 and to the arms 10*a*. In addition a somewhat U-shaped member 10*d* has two arms fastened as by welding to the cross bar 10*b* and the plate 10 to form an outer bearing for rod 11 which also passes through a clearance hole in the local arm 10*a* and through an upturned lug 10*e* at the rear end and side of the plate 10. The opposite edge of the plate 10 is carried in a slotted guide arm bracket 16. It will be noted from Figure 14 that the holes, 45 and 47 in 10*e* and 10*d* respectively through which the rod 11 passes, are triangularly shaped to take out all back lash and wobble of the rod 11 to which reference will be later made. The rear member of the carriage 10 has a notch or recess 10*f* therein to allow the carriage to have plenty of forward movement without narrowing up the rear cross plate member which, if done, would weaken the plate. Fastened to the cross bar 10*b* in spaced relation thereon and in alignment with the axial centers of the induction coils 7 are adjusting screws 26 held in place by lock nuts 97. To the inner ends of the screws 26 are fastened one end of stiff wires 32 the opposite ends of which fasten to their respective coil cores 27. By this construction it will be seen that the respective cores 27 may be adjusted to any desired position along the longitudinal axis of its induction coil as the tuning carriage moves back and forth on the rod 11 and guide 16 as the various radio stations are tuned in. An indicator support bracket 18 has downwardly turned flanges 18*a* and 18*b* with holes 91*a* therein to receive screws 91 for holding the bracket to the frame. Pivoted to the bracket 18 by a fulcrum screw 21 is a bell crank lever 20. The lever 20 is positioned at its fulcrum on a raised portion 18*c* so as to allow the arms of the lever 20 to be clear from any surface engagement with the bracket 18. One of the arms of the lever 20 is pivotally connected by a shoulder stud 40 near the middle portion of a relatively long lever 19. The other arm of the bell crank lever is pivotally fastened to a connecting link 38 by shoulder stud 39. The opposite end of the link 38 is pivotally fastened to the slide plate 10 by a stud 37. The bracket 18 has a slot 18*s* adjacent its rear end and positioned in this slot is an inwardly bent T-shaped end 18*t* of the lever 19. By this construction the lever 19 has a shiftable pivot so that as the bell crank lever 20 moves arcuately, the lever 19 is caused to move so that an indicator rod 22, that is fastened to a piece 22*a* which in turn is fastened to the end of the lever 19 by screw 35 and rivet or extrusion 41, is caused to move in a linear or horizontal path across the front of the structure to indicate the station selected on a calibration card, for instance (not shown). A carriage return spring 28 is anchored on and to a lug 18*c* on the bracket 18, and to a lug 20*a* on the bell crank lever 20. Further reference will be made to this arrangement of the spring 28 in connection with the operation of the structure.

On the bottom of the bracket 18, a spring 113 is fastened in a satisfactory manner as by rivets 122. The spring 113 engages the extended end of the shaft 77, its position being shown in dotted lines in Figure 10, and acts to take out any backlash on this end of the shaft by reason of a triangularly shaped hole (not shown) in the frame 1, with its apex pointing in the opposite direction from its cooperative hole in the member 4.

Positioned below the slide tuner plate 10, is a selector or tuning turret 33. As illustrated, the turret is hexagonal in shape and is provided with six sections with screws therein spaced 60° apart. Five of these screws, numbered 81, are alike and are utilized for the automatic sequence tuning. The sixth screw 79, has a greater thread pitch and is utilized for manual tuning. The arms 33*a* may have reinforcing ribs 33*b* fastened thereto as by welding.

The screws 81 are provided with an anti-backlash device for the purpose of constantly eliminating the clearance in the threads of the blocks 82 in order that they follow the same paths during rotation or reverse rotation of the screws precisely in synchronism with said rotation. These anti-backlash devices are composed of two slightly spaced threaded blocks 82 and 83 (see Figure 9), 82 being preferably thicker than 83 and positioned toward the central axis of the turret. The block 83 terminates in a rectangularly shaped end 83*a* that extends upwardly through a radial slot in an arm of the turret. This prevents rotation of the block 83.

The block 82 has a circular extension 82*a* extending above the projection 83*a* and thereby acts as a selector drive and stop pin. Between these extensions 82*a* and 83*a*, there is permanently fixed a back-lash spring 85 bent somewhat like a safety pin and acting to position the stop lugs 82*a* in substantially the same direction as all other forces acting on said stop. In the manual tuning screw 79, just a single-piece lug 78 is utilized having a pin extension 78*a* similar to and for the same purpose as the pins 82*a*. By utilizing the coarser pitch screw thread for the manual adjustment, the block 78 can be moved at a convenient rapid rate with fewer turns of the tuning knob 13. The finer thread on the screws 81 is utilized to yield as little reaction as possible on the part of the core tuning carriage to prevent inadvertently rotating the screw as the carriage follower cam member 42 thereon comes against the pin extensions 82*a*.

As the screws turn, it is seen that the follower or block 83 will follow the travel of block 82, and as there is a constant distance between them the effort of spring 85 is maintained constant, regardless of position. The action of spring 85 thus introduces a twisting action on block 82 which effectively eliminates thread clearance. The springs 85 exert a bias thrust on the top of the blocks which tends to make them follow one side of the radial slot in the turret 33. To stabilize the screws in their bearings and to provide a friction braking action to accidental rotation, each screw is taper-journaled at its interior end in the sides of a hexagonally shaped bushing 105 carried by the shaft 77. A thrust spring 80 is positioned in a groove 121 adjacent the head of the screw and acts to thrust the screw firmly in its tapered seat in the bushing 105. The taper journal serves two purposes: first, it acts as a brake to rotation of the screw, and, second, it prevents any lateral play between the screw and the hexagonal bushing 105.

Figure 4:
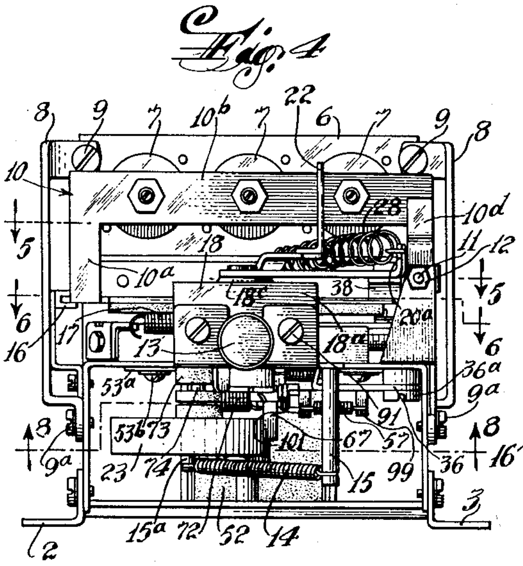
Figure 4 is an end view of Figure 1, looking from left to right.
Figures 5, 7:
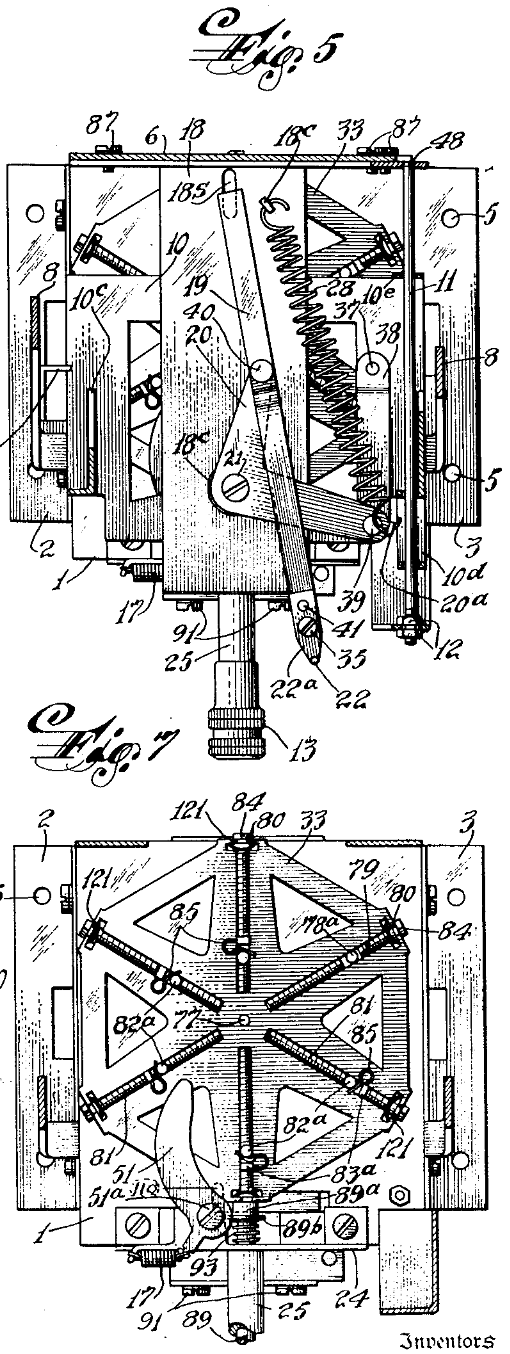
Figure 5 is a view on the line 5—5 of Figure 4.
Figure 7 is a view on the line 7—7 of Figure 1, the same as Figure 6, but with the slide tuner plate removed.
Figure 6:
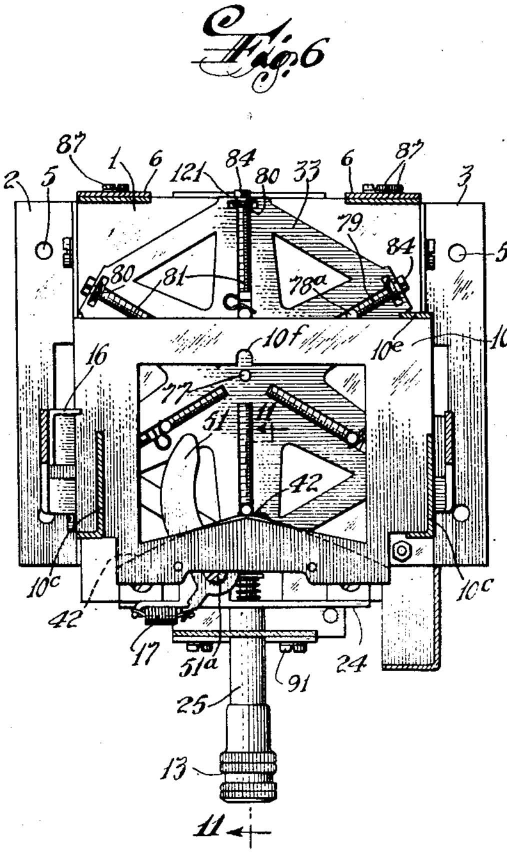
Figure 6 is a view on the line 6—6 of Figure 4, with the tuner carriage near its maximum forward position.

For cooperating with the hexagonal heads 84 of the screws 79 and 81, in order to adjust these screws to move the tuning blocks 82 and 83 to any desired position, an adjusting or tuning shaft 89 is provided. This shaft is carried in a bushing or sleeve 25 that is carried by a frame bracket 24. The inner end of the shaft 89 has fastened thereto a member 89*a* having an internal hexagonal socket to fit over the heads 84 of screws 79 and 81. The member 89*a* has a flange 89*b* between which and the end of the sleeve 25 is positioned a reset spring 93. As shown in Figure 11 the screws 79 and 81 have a circular portion 118 just back of the head which is journaled in the downwardly turned flange 33*c*. These flanges being formed on the turret in alignment with their respective arms 33*a*. Back of the circular bearing 118 a groove 121 is provided to receive a take up spring 80. Also pivotally mounted as by screw 51*a* on a frame member is a buffer lever 51 that extends over the turret 33 as shown in Figures 6 and 7 but not in direct engagement with the surface of the turret. The action is controlled by a spring 17. However, the lever 51 is adapted to contact with certain of the pins 82*a* and 78*a* as the turret is turned. The purpose of this lever 51 will be later described in the operation of the structure. Below the plate like frame member 1 is positioned the driving parts for the mechanism. These driving parts include a solenoid type of electro-magnet having a coil or winding 52 on a frame or spool 53. The frame has slotted lugs 53*a* for the purpose of adjusting the electro-magnet on the plate 1. Screws 53*b* being used to fasten the frame 53 in place. The frame or spool 53 is provided with an arcuately shaped hole as shown in the Cramer patent to which reference has been made to receive a circular type armature 23. The armature 23 has an arm 23*a* which at its inner end may carry a bushing (not shown) for receiving one end of the turret shaft 77. Carried by the armature 23 near the beginning of the arm 23*a* is a stud 74 on which is positioned a shock absorber bushing 73 made of suitable resilient material. The post 74 also acts as an anchor for one end of the shock absorber spring 72. As shown in Figure 4 the bushing 73 may be in two parts with the one end of the spring 72 passing therebetween. The other end of the spring 72 is attached to a hole in a release cam 65. The cam 65 is provided with a lifting face 69, a surface 70 of constant radius and a drop off point 71 all for purposes to be described in the operation of the structure. Positioned on one side of the cam 65 toward the frame member 1 and freely rotatable on the shaft 77 is a pawl arm 62 and on the outer end of this arm is pivoted by shoulder rivet 63 an index pawl 61 having toward its free end a lug to which a spring 64 is attached, the opposite end of the spring being fastened to a lug 68 on the cam 65 which has an armature follower lug 67 for contact with one edge of the arm 23*a* of the armature 23.

Pivotally mounted on the frame plate 1 as by means of screw 36*a* is a turret latch lever 36. This lever has a pawl 55 pivotally mounted thereon by a shoulder stud 58. This pawl has a lug 101 thereon to receive a spring 57 the opposite end of which is anchored to a lug 99 on the lever 36. The free end of the pawl 55 has a pin 56 for engaging the release cam 65 in a manner to be later described. The latch 36 has an arm 109 bent upwardly which passes through an orifice in the frame plate 1 and extends in a close proximity to the surface thereof terminating in an inwardly bent lug 110 (see Figure 7) which acts as a stop for engaging one side of the flanges 33*c* to act as a positive stop for rotation of the turret 33. The forward edge of this pivoting arm engages the flange 89*b* of the tuning rod 89. Attached to the lever 36 is a spring 86 one end of which is fastened to a reset stop stud 106 that is fastened to the frame plate 1. This stud also acts as a stop for the index pawl arm 62 which is engaged by the pawl arm driving lug 68 on the cam 65. On shaft 77, adjacent the pawl arm 62, is a bushing having ratchet means 60 with ratchet teeth spaced at 60° angles to cooperate with the pawl 61.

Attached to pin 15*a* carried by the armature 23, is a spring 14 having its opposite end connected to a post 15. This spring acts for returning the armature to its position as shown in Figure 3.

In the operation of the structure heretofore described, it is assumed that in the idle or normal position of the parts the tuning shaft 89 has its socket head 89*a* in engagement with the head 84 on one of the turret tuning screws. On passing current through the solenoid winding 52, the armature 23 is immediately rotated 90°, but during the first 30° of movement of the shaft 77 the pin 56 of pawl 55 will ride on the cam surface 69 of cam 65 and this will move the lever 36 so as to cause the arm lug 110 to move out of the path of one of the flanges 33*c* of the turret and also to move the circular collar 89*a* and the shaft 89 forwardly against the tension of the spring 93, thereby releasing the turret for rotation. During the 30° movement, no action of the index pawl arm 62 takes place and the turret does not move. As the pin 56 dwells along the surface 70 of the cam, shaft 89 and associated parts will remain in a disengaged position. However, the lug 68 on the cam 65 will have engaged the outer end of the pawl arm 62 and started movement of the turret 33. Prior to the completion of the stroke, pin 56 on the trigger lever 55 will have moved off the surface 70 at 71. At the same time one of the turret flanges 33c will have reached the arm 109 of the latch lever 36 and will ride along on it until the last instant when the notch in the arm will fall over the portion 33c by action of the reset spring 86 acting on the lever 36 thereby preventing the turret from moving any farther or from skipping any of its sequential positions. Even though the current be still passing through the winding 52 the turret can go no further and consequently the arm 62 and the cam 65 must stop but the armature 23 may continue a small amount by stretching the spring 72 to absorb the shock of these movements of the armature. When winding 52 is deenergized by opening the circuit therethrough, spring 72 will restore the lug 67 on the cam 65 against the back of the armature 23. The passing of the pin 56 over the point 71 of the cam 65 will allow the latch lever 36 to be drawn back by spring 86 into locking position thereby permitting the shaft 89 with its socket head to engage over a screw head 84, due to the returning action of the spring 93. After completion of the index cycle as just described and after opening the circuit of winding 52, the armature returns 90° clockwise (looking at Figure 3) to its starting point due to the tension of the spring 14. On this return stroke the trigger or pawl 55 pivots against the action of the spring 57 allowing the pin 56 to ride back over the surfaces 71, 70 and 69 at which time it snaps backs to its stop 100 on the lever 36 ready for the next cycle. This action is necessary in order that the latch of the turret will not be affected during the said return stroke of the armature. As the said return stroke is progressing, the pawl 61 will go only far enough to engage the next successive tooth on the ratchet means 60 and it is this factor that enables the device to be able to complete any cycle which may have been incomplete at the last switch impulse by simply closing the circuit again. As the turret moves, as just explained, one of the circular extensions 82*a* or 78*a* of the tuning lugs will be brought into contact with the camming surface 42 of carriage 10 which is preferably made of any suitable long-wearing material. The engagement as just explained will cause the tuning slide to move in a direction to withdraw the induction cores 27 to a position that will tune in the frequency for which they have been adjusted, the full tuning position being when one of these circular extensions is at the point indicated in Figure 6, which is the latched-in tuning position which has been explained. On a succeeding cycle a spring 28 will return the tuning carriage in a direction so its bar 10*b* will approach the free end of the induction coils 7. As has been explained, the movement of the tuning carriage is dependent on the adjusting position of the circular extensions and it will be seen that some of these are set on a short radius with respect to the turret shaft 77 and others on a longer radius and hence the speed of action of some of the interconnected movable parts may have a tendency to vary slightly and to compensate for this we utilize a buffer lever 51 which is in the form of a long curved finger which is supposed to be in the path of said circular extensions 82*a* and 78*a* as they are discarded from the tuning positions on tuning in a new station. Thus all these circular extensions that are adjusted on the long radius will strike said buffer lever 51 deflecting it against the action of its spring 17 and finally at the end of the cycle the buffer lever 51 will ride off the end of said extensions allowing the spring 17 to return the lever 51 to normal position. The longer the particular radius of adjustment of said circular extensions the more effective will be the action of the lever 51, whereas central stroke adjustments will be affected only slightly and extreme inward adjustments of the circular extensions will not be affected at all as they will pass by the end of the lever 51 without striking it, thus a more uniform load is put on the electromagnet.

The anti-back lash devices heretofore described prohibit any false relations taking place between various parts of the mechanism. Ordinary clearance bearings with reasonably good fits are not good enough for acceptable accuracy and are expensive to reproduce in quantity; hence the V-shaped bearings and anti-back lash devices are utilized in the manner and for the purposes described.

Existing tuners have usually employed a linear solenoid magnet having a highly frictional plunger engagement in the tube of the coil, and the plunger has been connected to move the core carriages in one direction against the pull of a tension spring which gains load at a constant rate as the spring is stretched, thus excessively loading the magnet. In our device, the plunger friction is eliminated by the use of the rotenoid, the armature of which is tracked through the air gaps and core of the magnet coil without friction or physical contact therewith. This is due to the small diameter bearings on which the armature is mounted for rotation. Furthermore, the spring for returning or urging the core carriage in one direction is acting through a bell crank and link which causes the moment arm of pull of the spring to diminish as the force of the spring increases due to stretching. Thus a more constant value of core carriage load has the tendency of materially reducing the power required of the magnet.

In Figure 12 we have shown a modified form of construction in which the tuning core carriage stroke is amplified greater than the radial adjustment of the tuning stops carried by the turret. The tuning stops as used in this construction are shown in Figure 12*a* in which the blank has a body portion 82*a* with a threaded hole 82*b* therein and a pair of arms 82*c* connected to the body part by the neck 82*d* that is adapted to move in the slot in the arms of the turret, the arms 82*c* being bent in a form shown in 82 in Figure 12. These arms and a neck 82*d* guide the stops as the adjusting screws are operated.

In this form of construction a lever 123 is pivotally connected to a stationary portion 124 of the frame. Its middle region 125 is made to follow the selector stop lugs 82 on the turret, while its outer extreme end carries a driving pin 126 that is located in an opening 127 in the carriage to impart motion thereto at a desired ratio. The spring 129 is fixed at one end to pin 126 in lever 123 and at the other end to a post 128 in the carriage to cause the pin to be engaged firmly with a bumper 127*a* forming one side of the opening 127 to eliminate back lash between said lever and said tuning core carriage. It will be seen from Figure 12 that the pin 126 has a fixed collar 126*a* to overlie the opening 127 thereby allowing the pin 126 to have considerable freedom of movement within the opening 127. Some of the above parts may be more clearly seen in Figure 13. The above construction lends itself to producing longer tuning core strokes without the necessity of using undesirably large selector turrets, otherwise the construction does not differ from the construction heretofore described from Figures 1 to 11 inclusive; however, it may be mentioned that in either construction the tuning slide may be carried on anti-friction bearings as shown in Figures 15 and 16. In these two figures instead of the rod 11 and its cooperative triangularly shaped bearing holes 45 and 47 (see Figure 14) in carriage 10, we provided a flange 130 bent down to form a carriage support. This flange is provided with two longitudinally spaced slots 131 in alignment with each other and having a length equal to slightly more than ½ of the desired carriage stroke plus the diameter of the ball bearings used. These slots are wide enough for a ball to ride in each side of the slot without interference with each other. In Figure 15 the carriage is shown in mid position. Slots 132 are similar to 131 and are provided in the side of the frame 1, four balls being provided, two of which ride between slots 132 and slots 131 and the other two ride between slots 131 and 133 similarly arranged in pressure plate 134. A U-shaped retainer 139 is preferably provided having four holes engaged with the four balls loosely to maintain a constant center distance between the pairs of balls. The pressure plate 134 acts as a yoke type of lever fulcrumed by the screw 135 threaded into frame 1 and the washer 136. Pressure upon the fulcrum is always in the same direction and is provided for by compression spring 142 acting between frame 1 and the lower end of lever 134. Said spring is captivated by screw 140 threaded in frame 1 and lock nut 141 for securing it in adjusted position. This adjustment provides a clearance between lever 134 and the head of screw 140 to permit pressure plate 134 to breathe microscopically as the carriage 10 is moved. The force of spring 142 is however divided by the lever and central fulcrum so as to always press on both sets of balls 138. It is thus seen that even with considerable pressure in spring 142, the carriage will run smoothly as the balls roll in the slots without binding and without any bearing rattle or back lash. A pair of pins fixed in frame 1 enter clearance holes 137 in plate 134 to prevent accidental motion thereof, but they in no way affect the normal functioning thereof, as they do not touch the plate 134 when the slots thereof are engaged with the balls. These pins serve to prevent excessive longitudinal movement of plate 134 but do not prevent the normal necessary ball squeezing action.

In Figures 17–19 there is shown an alternate turret indexing and unlatching mechanism.

With reference to these figures we show a different cycling mechanism than was shown previously on Figures 3, 7 and Figure 8. Suppose in these three figures we consider that the cam 65 is omitted and in its place a new lever 143 is mounted free for rotation on shaft 77. Lever 143 is made to follow the action of the armature 23 being held against it through the medium of lug 154 and spring 72 in the same manner as was the cam 65. This gives the same shock absorbing characteristics in the device of Figure 17 as existed in the preceding mechanism. Parts 99, 57, 101, 58, 100, 55 and 56 are omitted from the latch lever 36 on Figure 8. The assembly of arm, pawl and spring 61, 62, 63, 64 are omitted as well as the ratchet 60. In place of the parts omitted from latch lever 36 we utilize a corresponding latch lever 144 having a latch arm 160 with a notch 102 therein. The free end of lever 144 has a rising cam face 145, a dwelling face 146 and a drop off point 147. In place of the ratchet means 60, six internal ratchet teeth 148 form a part of the turret assembly, 149. In the place of 61, 62, 63, 64, 55, 56, etc., we show instead a new pawl 150 pivotally mounted at 153 on carrier lever 143 and urged to be rotated, in a counterclockwise direction with respect to said lever by a spring 151, to a fixed limit defined by driving lug 152 forming a part of lever 143. A spring 86 is connected between the lever 144 and the frame 1 to return said lever to engagement with the rotating turret as before. Considering that the armature is at its starting point with ninety degrees to go in a clockwise direction under electro-magnetic power and that the new lever 143 carrying pawl 150 is under control of the armature, then as the motion of lever 143 starts, the pawl 150 cooperates with the lifting cam face 145 to disengage the latch arm 160 from the turret, freeing it for rotation. This represents about thirty degrees of motion. After this is complete, the pawl 150 engages one of the internal ratchet teeth 148 and advances the turret during which time the pawl 150 rides onto the dwell 146 of lever 144. Prior to completion of the sixty degrees of rotation, the pawl 150 rides off the end 147 of lever 144 and allows it to return to latching position and as the said sixty degrees is completed the turret is stopped and latched in position by the notch 102 of lever arm 160 as previously described. During the spring return stroke of the armature the pawl 150 yields away from the driving lug 152 against action of spring 151 and drags itself back over the next ratchet tooth 148 and the cam end 147 of latch lever 144 and cam faces 146, 143 until it is back at the starting point, just prior to which the pawl 150 snaps back against driving lug 152 and creates the free motion of thirty degrees before it again would engage a ratchet tooth 148. It is readily seen that this system creates the same timing as the previously disclosed system shown in Figures 3, 7 and 8.

It is also obvious that many of the details may be varied without departing from the spirit of our invention and the scope of the appended claims. Having thus described our invention, what we claim is:

1. A sequential tuning mechanism for a radio receiving set including a framework, a turret rotatably supported in the framework, ratchet means associated with the turret to aid in turning it, a circularly formed armature rotatably mounted for actuation of said turret, a coil for moving said armature in an arcuate direction through the coil, and means for returning the armature to starting position, co-acting means positioned between the ratch means and the armature to interlink them after a predetermined arcuate movement of the armature, a carriage slidably mounted on said framework and having means for co-acting with a device capable of sliding it, tuning means supported by the framework and having movable parts fastened to adjustable means on said carriage, adjustable devices carried by the turret for acting on said carriage co-acting means as the turret is turned to move the carriage to a tuning position, means for locking and unlocking the turret in and from its tuning position and means acting on the carriage to urge it in a direction opposite to the tuning direction set up by said turret device.

2. A sequential tuning mechanism as set forth in claim 1, further characterized in that the turret has equally spaced sections each of which carries a screw with a threaded block thereon adapted to travel longitudinally of the screw as the same is turned, the block having an extension which will engage a cam member on the carriage to move it to a tuning position as defined by the location of said block on its screw.

3. A sequential tuning mechanism as set forth in claim 1, further characterized in that the turret has equally spaced slotted arms with downwardly extending flanges at the periphery of the turret in alignment with the arms, a screw for each arm having its head end located in its flange and its inner end tapered to fit a cooperative socket in a part of said turret, each screw having a threaded block thereon with an extension projecting through the slot in its arm, said extension acting when the turret is turned on a member of the tuning carriage to move it to a tuning position, dependent on the location of the block on its screw.

4. A sequential tuning mechanism as set forth in claim 1, further characterized in that the turret has equally spaced slotted arms with downwardly extending flanges at the periphery of the turret in alignment with the arms, a screw for each arm having its head end located in its flange and its inner end tapered to fit a cooperative socket in a part of the turret, each screw for automatic tuning having a pair of slightly spaced threaded blocks thereon, both blocks having extensions projecting through the slot in its arm, the inner block having its projection longer than the other and a back lash spring positioned between said blocks, the longer extension acting when the turret is turned on a member of the tuning carriage to move it to a tuning position, dependent on the location of the block on its screw.

5. A sequential tuning mechanism as set forth in claim 1, further characterized in that the turret has equally spaced slotted arms with downwardly extending flanges at the periphery of the turret in alignment with the arms, a screw for each arm having its head positioned outside its associated flange, the screw having an annular recess between its head and thread with a thrust spring between the inner wall of the recess and the inner surface of the flange, the inner end of the screw being socketed in a part of the turret, each screw having a threaded block thereon with an extension projecting through the slot in its arm, said extension acting when the turret is turned on a member of the tuning carriage to move it to a tuning position, dependent on the location of the block on its screw.

6. A sequential tuning mechanism as set forth in claim 1, further characterized in that the turret has equally spaced slotted arms with downwardly extending flanges at the periphery of the turret in alignment with the arms, a screw for each arm having its head positioned outside its associated flange, the screw having an annular recess between its head and thread with a thrust spring between the inner wall of the recess and the inner surface of the flange, the inner end of the screw being socketed in a part of the turret, each screw for automatic tuning having a pair of slightly spaced threaded blocks thereon, both blocks having extensions projecting through the slot in its arm, the inner block having its projection longer than the other and a back lash spring positioned between said blocks, the longer extension acting when the turret is turned, on a member of the tuning carriage to move it to a tuning position dependent on the location of the block on its screw.

7. A sequential tuning mechanism as set forth in claim 1 further characterized in that the turret is hexagonal in shape with sixty degree spaced slotted arms with downwardly turned flanges adjacent the outer ends of the arms, screws carried between the flanges and a turret part, a pair of threaded spaced blocks on at least five of the screws and having extensions going through their arm slot, the extension on the inner block being longer than the other with a spring between said extensions, the longer extension acting, when the turret is turned, on a member of the tuning carriage to move it to a tuning position, dependent on the location of the block on its screw.

8. A sequential tuning mechanism as set forth in claim 1 further characterized in that said coacting means positioned between the turret ratchet means and armature includes a release cam having control surfaces thereon and a latch lever having a pawl pivoted thereon with a pin at its free end to follow said cam surfaces, the latch lever having an arm for engaging angularly spaced parts of the turret to hold it in a tuning position, said latch lever being released by its said pawl pin running on one of said cam control surfaces, the cam having a connection with said armature whereby it is started in motion when the armature starts its rotation, an index arm having a pawl for engaging the ratchet means and means associated with the cam for moving the index pawl into engagement with the ratchet means after a predetermined time and movement of the cam and means for restoring the latch lever to latching position after a predetermined movement of said cam.

9. A sequential tuning mechanism as set forth in claim 1 further characterized in that said coacting means positioned between the turret ratchet means and armature includes a release cam having control surfaces thereon and a latch lever having a pawl pivoted thereon with a pin at its free end to follow said cam surfaces, the latch lever having an arm for engaging angularly spaced parts of the turret to hold it in a tuning position, said latch lever being released by its said pawl pin running on an initial surface on the cam of approximately thirty degrees (30°) arcuate length, an index arm having a pawl brought into engagement with the ratchet means while said latch lever pawl pin is running on the next adjacent cam surface at the end of which the said pawl pin drops off this last surface and thereby freeing the latch lever, and a spring for returning the lever to latching position and means for allowing the latch lever pawl to pass freely over the cam surfaces on the return movement of the cam and means for returning the armature and cam to starting position.

10. A sequential tuning mechanism as set forth in claim 1 further characterized in that said co-acting means positioned between the turret ratchet means and armature includes a release cam having control surfaces thereon and a latch lever having a pawl pivoted thereon with a pin at its free end to follow said cam surfaces, the latch lever having an arm for engaging angularly spaced parts of the turret to hold it in a tuning position, said latch lever being released by its said pawl pin running on an initial surface on the cam sufficient in length to cause only the release of the latch lever, the cam having an arm with its end flexibly attached to said armature, the cam also having a camming surface next to said initial surface for holding the latch lever out of latching position for a time, means including a pawl associated with the cam for engaging the ratchet wheel at approximately the time when said pawl pin rides onto said second mentioned camming surface, which allows the said pin to drop off to free the latch lever when the turret has turned enough to have this tuning step clear, means for returning the latch lever to a position to engage the turret as the next tuning position means approaches and means for returning the armature and cam to starting position.

11. A sequential tuning mechanism as set forth in claim 1 further characterized in that the turret has equally spaced sections each of which carries a screw with threaded means thereon adapted to travel longitudinally of the screw as the same is turned, said threaded means having a formation thereon which will engage a cam member on the carriage to move it to a tuning position.

12. A sequential tuning mechanism as set forth in claim 1 further characterized in that the turret has equally spaced sections each of which carries a screw with threaded means thereon adapted to travel longitudinally of the screw as the same is turned, said threaded means having a formation thereon which will engage a cam member on the carriage to move it to a tuning position, and a single common means manually operable carried by the framework for engaging and turning the screws when the turret is turned to a tuning position.

13. A sequential tuning mechanism as set forth in claim 1 further characterized in that the turret has equally spaced sections each of which carries a screw with threaded means thereon adapted to travel longitudinally of the screw as the same is turned, said threaded means having a formation thereon which will engage a cam member on the carriage to move it to a tuning position, and a single common means manually operable carried by the framework for engaging and turning the screws when the turret is turned to a tuning position, one of said screws having a coarser thread than the others whereby easy manual tuning over the usual broadcast range may be had.

14. A sequential tuning mechanism as set forth in claim 1 further characterized in that the turret has equally spaced sections each of which carries a screw with threaded means thereon adapted to travel longitudinally of the screw as the same is turned, said threaded means having a formation thereon which will engage a cam member on the carriage to move it to a tuning position, a manually operable tuning shaft rotatably supported by the frame and having an end adapted to fit the heads of said screws and spring means for automatically moving the shaft end into engagement with a screw head as the same is moved by the turret into tuning position, said locking and unlocking means for the turret also serving to move said shaft end out of engagement with the screw head and to allow it to later return into said engagement.

15. A sequential tuning mechanism as set forth in claim 1 further characterized in that the framework includes a bracket positioned over the tuning carriage, a plurality of levers carried by said bracket, one of said levers being connected to a lever or link on the tuning carriage for translation of movement therefrom while another lever on the bracket carries an indicator finger to show the station tuned in.

16. A sequential tuning mechanism as set forth in claim 1 further characterized in that the framework includes a bracket positioned over the tuning carriage, a bell crank lever having one arm pivoted to a lever or link pivoted to the tuning carriage, a relatively long lever pivoted intermediate its ends to the other arm of the bell crank ever, said long lever having an inwardly bent end positioned in a slot in the rear end of said bracket for the purpose described, with means for holding this end in the slot, the free end of said long lever having an indicator finger thereon and a compensating spring for returning the carriage, the said spring being anchored at one end to the junction of one arm of the bell crank lever and the lever or link which is pivotally fastened to the carriage, the spring extending in a diagonal direction with respect to said bracket and carriage and having its opposite end connected to the bracket end adjacent the slot therein.

17. A sequential tuning mechanism as set forth in claim 1 further characterized in that the framework includes a bracket positioned over the tuning carriage, a plurality of levers carried by said bracket, one of said levers being connected to a lever or link on the tuning carriage for translation of movement therefrom while another lever on the bracket carries an indicator finger to show the station tuned in, said levers being formed and arranged so the finger on its lever will move in a straight transverse plane.

18. A sequential tuning mechanism as set forth in claim 1 further characterized in that the turret has equally spaced slotted arms each of which carries a screw, each of said adjustable devices carried by the turret, has a threaded body portion for its screw with a neck for slidable movement in its arm slot and a pair of arms bent U-shaped above the neck and in a position to engage a cam member partially carried by the carriage as the turret is turned.

19. A sequential tuning mechanism as set forth in claim 1 further characterized in that means are provided for getting a longer tuning carriage stroke than the adjustment of the adjustable devices on the turret, said means including a lever pivoted at one end to a side of the framework with its other end pivoted to that side of the tuning carriage opposite the side where said framework pivot is located, the lever having a cam surface intermediate its ends to be engaged by said turret devices.

20. A sequential tuning mechanism as set forth in claim 1 further characterized in that means are provided for getting a longer tuning carriage stroke than the adjustment of the adjustable devices on the turret, said means including a lever pivoted at one end to a side of the framework with its other end having a pin located in an opening on one side of the tuning carriage opposite the framework pivot, a spring fastened between the pin and the carriage to hold the pin against one side of the opening for a bumper therein, the lever having a cam surface near its central portion to be engaged by said turret devices.

21. A sequential tuning mechanism as set forth in claim 1 further characterized in that means are provided for taking out back-lash and wobble in the movement of the tuning slide, said means including triangularly shaped holes arranged in the slide support arms, through which a frame supporting rod passes, so the rod runs on two sides of the hole forming a vertex toward which the force on the slide in use is directed.

22. A sequential tuning mechanism as set forth in claim 1 further characterized in that means are provided for taking out back-lash and wobble in the movement of the turret shaft, said means including a triangularly shaped hole in a bottom framework member, the lower end of the shaft engaging two sides of the hole forming an apex toward which the shaft is pushed by the main force thereon and a spring fastened to the indicator support bracket and having its free end engaging the upper end of the shaft in a direction as shown.

23. A sequential tuning mechanism as set forth in claim 1 further characterized in that said coacting means positioned between the turret ratchet means and armature includes, a rotatable member having a lug held by a spring in operative engagement with the armature, a pawl pivotally mounted on said member and normally resiliently held against a stop thereon, a latch lever having an arm for engaging parts of said turret after the turret has been moved by the armature through one of its cycles, the latch lever having cam surfaces engaged by said pawl to control the movement of said lever, said member in its movement bringing said pawl into engagement with said ratchet means after first moving the latch lever and arm to release the turret.

24. A sequential tuning mechanism for a radio receiving set including, a framework, a turret mounted for rotation only in the framework, a tuning carriage having its main portion slidably mounted on the framework above the turret and having oppositely disposed upwardly extending arms connected by a crossbar carrying adjusting devices, circuit tuning parts attached to said devices, circuit tuning parts mounted on the framework for cooperation with said first mentioned tuning parts, means mounted in equal angularly spaced relation but radially adjustable on the turret for directly acting on the carriage to move it to a position defined by said turret adjustable means, means for rotating the turret one step at a time and means for moving the carriage in an opposite direction from that given it by the turret.

25. A sequential tuning mechanism as set forth in claim 1, further characterized in that said carriage has a downwardly bent edge or flange having spaced slots in alignment with each other and having a length somewhat more than half of the desired carriage stroke, said framework having slots therein to cooperate with the slots in said flange, a pressure plate located outside said flange and having slots to cooperate with the slots in the flange, a U-shaped ball retainer embracing the lower edge of said flange and having holes therein to receive balls, balls carried by the retainer and means for applying a resilient acting pressure by the pressure plate on the balls.

26. A sequential tuning mechanism as set forth in claim 1, further characterized in that said carriage is mounted at least on one side by anti-friction bearings with means for resiliently applying pressure to the balls for the purpose described.

27. A sequential tuning mechanism for a radio receiving set including a framework, tuning means having stationary and movable parts carried by the framework, a turret rotatably carried by the framework, an electro-magnet having an armature and core space formed so the armature which has interconnecting operating means with the turret, will directly move the turret one complete tuning step, the turret having equal arcuately arranged but radially extending screws carrying tuning lugs adjustably mounted on the screws, movable means carried by the framework and actuated by said lugs for moving said movable parts of the tuning means and a spring for urging said movable means toward said lugs.

28. A tuning mechanism for a radio receiver having a radio station indicator and including a slidable member for moving a plurality of circuit tuning parts, means carried by said member and adapted to be acted on to slide said member in one direction, spring means for moving said member in another direction, a turret having arcuately positioned but radially adjustable tuning lugs for engaging said means carried by said member for positioning said member, an electro-magnet having a circular armature which has interconnecting operating means with the turret, for directly moving the turret, at one stroke, the angular space of one lug and also through the said lugs moving the slidable member in a direction opposite to said spring means, and means comprising a system of levers operated by said slidable member for moving said radio station indicator along a straight plane.

29. A sequential tuning mechanism having a framework, a carriage slidably mounted thereon and carrying tuning parts, said carriage having means associated therewith adapted to be acted on for sliding the carriage into tuning position, a rotatable turret located directly below the said carriage, a plurality of devices arranged in equal angular spaced relation on the turret and radially adjustable thereon for acting on the means associated with the carriage for sliding the carriage into tuning position, electrically operable means for rotating said turret through only one of said angular spaces at a time to move the carriage to a tuning position, lever and link means connected between the framework and carriage, and resilient means interconnected with said lever and link means so as to get approximately a constant spring action on the carriage for all movements thereof.

30. A sequential tuning mechanism having a framework, a carriage slidably mounted thereon and carrying tuning parts, said carriage having means associated therewith adapted to be acted on for sliding the carriage into tuning position, a rotatable turret located directly below the said carriage, a plurality of devices arranged in equal angular spaced relation on the turret and radially adjustable thereon for acting on the means associated with the carriage for sliding the carriage into tuning position, electrically operable means for rotating said turret through only one of said angular spaces at a time to move the carriage to a tuning position, lever and link means connected between the framework and carriage, resilient means interconnected with said lever and link means so as to get approximately a constant spring action on the carriage for all movements thereof, and an indicator interconnected with a framework member and said lever means so as to get a transverse movement of the indicator in a straight plane.

31. A sequential tuning mechanism having a framework, a carriage slidably mounted thereon at least in part on automatic take up bearings and carrying tuning parts, said carriage having means associated therewith adapted to be acted on for sliding the carriage into tuning position, a turret located directly below said carriage and rotatably supported by a shaft positioned in clearance free bearings of the V type with spring means acting on the shaft continuously to hold the shaft in the apex of the V in the framework, a plurality of adjustable devices having automatic take up means angularly spaced on the turret for engaging the means associated with the carriage to move it to a tuning position, spring means for initially moving the carriage to a starting position for action thereon by one of said devices, electro-magnetic means for turning the turret one angular space at a time, and means for locking the turret in the tuning position.

32. A sequential tuning mechanism having a framework, a carriage slidably mounted thereon and carrying tuning parts, said carriage having means associated therewith adapted to be acted on for sliding the carriage into tuning position, a rotatable turret, a plurality of devices arranged in equal angular spaced relation on the turret and radially adjustable thereon for acting on the means associated with the carriage for sliding the carriage into tuning position, an electro-magnet having a circular armature which has interconnecting operating means with the turret, with a stroke sufficient to move the turret through only one of said angular spaces at a time to move the carriage to a tuning position, means for locking the turret at the end of its tuning movement, means for removing the lock during the early part of a new movement of the armature and spring means acting on the carriage immediately it is released by the turret device to move it to a position where it will be engaged by another of said turret devices.

33. In a radio tuning mechanism having a frame work, a movable tuning member carried by the frame work and being positionable at various positions thereon, a unidirectional spring for moving said member in one direction, a turret having a shaft carried by the framework for intermittent rotation, the turret carrying at equiangular spacings a number of radial adjustably positioned lugs, manually operable means automatically positioned for adjusting the position of said lugs as well as to lock the turret from rotation, an indexing and latch-controlling mechanism for disengaging said means, unlocking said turret and indexing it as required; said mechanism including a ratchet wheel rotatably carried on said shaft but fastened to said turret, a release cam fastened on the shaft, an index pawl rotatably carried on the shaft and brought into operation with the ratchet wheel by movement of said cam, a latch lever with a spring to hold it in one direction of operation, the lever having a pawl operatively positioned in engagement with said cam and responsive to movement thereof and also having a member adapted to engage parts on the turret to act as a positive stop therefor when said lever is moved toward locking position by its holding spring and allow said manually operable means to move into locking position, said lever member also acting when said latch lever is moved in another direction by said cam and its pawl to unlock the turret; means carried on the movable tuning member adapted to be engaged by said turret lugs for moving the tuning member to tuning position in a direction opposite to the movement caused by said spring, an electro-magnetic resettable power unit for operating said controlling mechanism and resetting means for said power unit.

34. A radio tuning mechanism as set forth in claim 33, further characterized in that said lugs are provided with automatic take-up means.

35. A radio tuning mechanism as set forth in claim 33, further characterized in that said power unit is connected to said indexing mechanism through resilient means as and for the purpose described.

36. A tuning mechanism for a radio receiver including a slidable carriage supported and moving simultaneously a plurality of circuit tuning parts, spring means connected to said carriage through a bell crank and link for moving said carriage in one direction and means associated with the carriage adapted to be acted on to slide the carriage in a direction opposite to the spring, a turret positioned below said slidable carriage and having equal angularly positioned adjustable tuning lugs for engaging said carriage associated means for moving and positioning the carriage, an electro-magnet having a circular armature, pawl and ratchet means for connecting said armature to said turret and for directly moving the same at one stroke the angular space of one lug and causing said lug to engage said means associated with the carriage for sliding the carriage in a direction opposite to that of said spring.

37. A sequential tuning mechanism including a slidable tuning carriage having means connected thereto adapted to be acted on for sliding it and carrying tuning parts, a rotatable turret located directly below said carriage with means for rotating the turret, a plurality of adjustable devices angularly positioned but radially adjustable on the turret for acting on said means on the carriage to slide it directly to its tuning position, a spring interconnected with the carriage through the medium of a bell crank lever and a link connected between an arm of said lever and the carriage, said spring acting to hold the carriage in tuning position and also serving to urge the carriage in a direction opposite to the tuning direction set up by said turret device, means for locking the turret after the carriage has been moved against the tension of said spring to tuning position and means including part of the locking means for unlocking the turret.

JOHN HOWARD TEAF.
STANLEY S. CRAMER.

REFERENCES CITED

The following references are of record in the file of this patent:

UNITED STATES PATENTS

| Number | Name | Date |
|---|---|---|
| 2,270,117 | Fill | Jan. 13, 1942 |
| 2,286,283 | Kirk et al. | June 16, 1942 |
| 2,310,720 | Wandrey | Feb. 9, 1943 |
| 2,342,851 | Fichter et al. | Feb. 29, 1944 |
| 2,411,754 | Pifer et al. | Nov. 26, 1946 |